3,032,480
PURIFICATION OF PENTABORANE-9 BY DISTILLATION IN THE PRESENCE OF A LEWIS ACID
Marion D. Ford, Arlington, Va., assignor to Callery Chemical Company, Pittsburgh, Pa., a corporation of Pennsylvania
No Drawing. Filed Feb. 18, 1959, Ser. No. 793,977
5 Claims. (Cl. 202—57)

This invention relates to a method for the purification of pentaborane-9, $B_5H_9$, and in particular to a method for the removal of unstable borane impurities from pentaborane-9.

Pentaborane-9, $B_5H_9$, is the most stable boron hydride. For this reason and because of its extremely high heat of combustion, this compound is becoming increasingly important both as a fuel and as a fuel additive. In such applications storage stability is an important consideration. Inasmuch as the methods by which pentaborane-9 is ordinarily prepared result in other, less stable boranes as by-products, the small amounts of such by-products remaining as impurities in the recovered pentaborane-9 must be removed in order that the finished product possess suitable storage stability.

One object of this invention, therefore, is to provide a method for the removal of unstable impurities from pentaborane-9.

Another object is to provide a method for purifying pentaborane-9 which is simple, safe, and easily practiced.

Other objects will become apparent from time to time throughout the following specification and claims.

This invention is based upon the discovery that certain basic compounds react preferentially with unstable boranes to form stable, non-volatile adducts and that addition of such basic compounds to pentaborane-9 containing unstable boranes permits distillation of pure pentaborane-9 from the mixture.

The unstable boranes which are generally present in impure pentaborane-9 and which are removed by the method of this invention, include tetraborane-10, $B_4H_{10}$, pentaborane-11, $B_5H_{11}$, and diborane, $B_2H_6$.

The basic compounds which may be used in the practice of this invention are strong Lewis bases, and may be defined as any compound which forms an adduct with borane, $BH_3$, which adduct is stable at room temperature (about 25° C.).

In the Lewis electronic theory of acids and bases, a base, i.e. a Lewis base, is defined as any structure containing an atom which is capable of donating an electron pair. Thus, the definition of acid-base behavior is not made dependent upon any particular element, such as hydrogen in the classic definition of acids, nor upon the presence of a solvent, as is the case with certain solvent system theories of acids and bases. Rather, it is solely the propensity of an element or compound to attract or donate electrons which determines its classification in the Lewis system.

The Lewis theory of acids and bases is particularly useful in the study of the reactions of the boron hydrides and their derivatives. The boron hydrides are electron deficient and therefore tend to attract and accept electrons, and are Lewis acids tending to form adducts with Lewis bases. The stability of these adducts depends upon the acid strength of the boron compound, which varies among the hydrides, and upon the base strength of the coordinating compound.

I have found that in the practice of this invention any Lewis base may be used which forms an adduct with borane, $BH_3$, which is stable at room temperature. Such compounds react preferentially with the unstable boranes found as impurities with the pentaborane-9 to form stable adducts, whereas their adducts with pentaborane-9, if any such form, are relatively unstable and dissociate during distillation to yield the pentaborane-9.

Examples of Lewis bases which form stable adducts of the general formula $X:BH_3$, where X is the Lewis base, and which are useful in the purification method described herein, are the alkyl amines, such as primary, secondary and tertiary methyl and ethyl amines, n-propylamine, butyldimethylamine, propyldimethylamine, and tri-n-decylamine; cyclic amines, such as pyridine, lutidine, picoline, collidine, pyrrolidine, pyrazine and pyrrole; alkyl phosphines, such as the methyl phosphines; and alkyl sulfides, such as dimethyl sulfide. It must be noted that certain compounds because of steric effects resulting from, for example, branched-chain or aryl groups, are weak Lewis bases and therefore do not form stable complexes with $BH_3$. Tri-isopropylamine and phenyldimethylamine are examples of such compounds. In every case, however, a compound which forms an adduct with borane, $BH_3$, which is stable at room temperature, may be used in the practice of this invention.

The procedure used to purify pentaborane-9 according to this invention is simple and easily practiced in conventional equipment. The basic compound is added to the impure pentaborane-9; pure pentaborane-9 may then be distilled from the mixture with the impurities remaining behind in the form of non-volatile complexes with the base. For example, in one test, 2.5 millimoles of trimethylamine were added to 4.47 millimoles of a mixture of pentaborane-9, tetraborane-10 and diborane. Upon distillation at reduced pressure, 3.02 millimoles of pure pentaborane-9 were obtained.

Although pentaborane-9 free from borane impurities is recovered in the manner described above, any excess base will tend to slowly react with the pentaborane-9 and reduce the quantity of recovered product. I prefer to minimize the loss of pentaborane-9 by using only about two moles of base for each mole of unstable borane present. The use of a two to one molar ratio results in little if any excess base, and consequently quantitative recovery of the pentaborane-9 may be achieved. In order to permit the use of the two to one molar ratio, in practice the approximate composition of the mixture to be purified is determined by a preliminary infra-red or mass spectrometer analysis. The desired amount of base can then be calculated and added.

Because of the exothermic nature of the addition reaction which takes place between the base and the unstable boranes, it is preferred to cool the reaction mixture during the addition, particularly when large amounts of the unstable boranes are present. Temperatures of about 0° C. are ordinarily used, and generally the mixture is warmed to room temperature before the pentaborane-9 is recovered.

According to the provisions of the patent statutes, I have explained the principle and mode of practicing my invention, have described what I now consider to be its best embodiments. However, I desire to have it understood that within the scope of the appended claims, the invention may be practiced otherwise than as specifically described.

I claim:
1. A method for purifying pentaborane-9 which comprises contacting pentaborane-9 containing unstable boranes as impurities with a Lewis base that forms a stable adduct with borane, $BH_3$, at about 25° C., said Lewis base being selected from the group consisting of amines, alkyl phosphines and alkyl sulfides, and distilling pure pentaborane-9 from the reaction mixture thus produced.

2. A method according to claim 1 in which about two moles of Lewis base are used for each mole of unstable borane present.

3. A method according to claim 1 in which the Lewis base is added while maintaining the reaction mixture at about 0° C.

4. A method according to claim 1 in which the Lewis base is selected from the group consisting of primary, secondary and tertiary methyl and ethyl amines, and cyclic amines.

5. A method for purifying pentaborane-9 which comprises contacting pentaborane-9 containing unstable boranes as impurities with trimethylamine and distilling pure pentaborane-9 from the reaction mixture thus produced.

References Cited in the file of this patent

Schechter et al.: "Boron Hydrides and Related Compounds," prepared under Contract NOa(s) 10992 for Dept. of Navy, Bureau of Aeronautics, prepared by Calery Chemical Co., declassified December 1953, pp. 28, 36.

Stone: "Quarterly Review," vol. 9, page 193 (1955).

Burg et al.: "Journal of the American Chemical Society," vol. 59, page 786 (1937).

Burg: "Journal of the American Chemical Society," vol. 79, page 2130 (1957).

UNITED STATES PATENT OFFICE
CERTIFICATE OF CORRECTION

Patent No. 3,032,480　　　　　　　　　　　　　　May 1, 1962

Marion D. Ford

It is hereby certified that error appears in the above numbered patent requiring correction and that the said Letters Patent should read as corrected below.

In the heading to the printed specification, lines 2 and 3, the title should appear as shown below instead of as in the patent:

PURIFICATION OF PENTABORANE-9 BY DISTILLATION IN THE
　　PRESENCE OF A LEWIS BASE

Signed and sealed this 6th day of November 1962.

(SEAL)
Attest:

ERNEST W. SWIDER
Attesting Officer

DAVID L. LADD
Commissioner of Patents